(12) United States Patent
Wolrich et al.

(10) Patent No.: US 6,738,831 B2
(45) Date of Patent: May 18, 2004

(54) COMMAND ORDERING

(75) Inventors: Gilbert Wolrich, Framingham, MA (US); Mark B. Rosenbluth, Uxbridge, MA (US); Debra Bernstein, Sudbury, MA (US); Richard Guerin, Hudson, MA (US)

(73) Assignee: Intel Corporation, Santa Clara, CA (US)

( * ) Notice: Subject to any disclaimer, the term of this patent is extended or adjusted under 35 U.S.C. 154(b) by 257 days.

(21) Appl. No.: 10/017,875

(22) Filed: Dec. 12, 2001

(65) Prior Publication Data

US 2003/0110322 A1 Jun. 12, 2003

(51) Int. Cl.[7] .............................................. G06F 13/00
(52) U.S. Cl. ......................................... 710/5; 711/143
(58) Field of Search ................................ 710/5, 6, 112, 710/113, 314; 711/150, 141, 113, 158, 151, 135; 709/224, 213, 223, 227

(56) References Cited

U.S. PATENT DOCUMENTS

| | | | | |
|---|---|---|---|---|
| 5,008,808 A | * | 4/1991 | Fries et al. ..................... | 710/6 |
| 5,790,813 A | * | 8/1998 | Whittaker .................... | 710/113 |
| 6,047,334 A | * | 4/2000 | Langendorf et al. ........... | 710/5 |
| 6,182,177 B1 | * | 1/2001 | Harriman .................... | 710/112 |
| 6,247,086 B1 | * | 6/2001 | Allingham ................... | 710/314 |
| 6,249,829 B1 | * | 6/2001 | Bloks et al. ................. | 710/113 |
| 6,311,256 B2 | * | 10/2001 | Halligan et al. ............. | 711/158 |
| 6,529,999 B1 | * | 3/2003 | Keller et al. ................. | 711/141 |

* cited by examiner

Primary Examiner—Christopher B. Shin
(74) Attorney, Agent, or Firm—Fish & Richardson, PC

(57) ABSTRACT

A method of ordering commands includes receiving a set of related commands that have a predetermined execution sequence, the commands being received in an arbitrary order that may be different from the execution sequence and releasing a later received command of the set for execution before an earlier received command from the set based on the execution sequence.

30 Claims, 1 Drawing Sheet

COMMAND ORDERING

TECHNICAL FIELD

This invention relates to command ordering.

BACKGROUND

Computer processing systems often include several logic blocks that operate concurrently. Logic blocks may share a bus that is used to send commands to another logic block, such as a memory or memory controller.

DESCRIPTION

Figure 1:
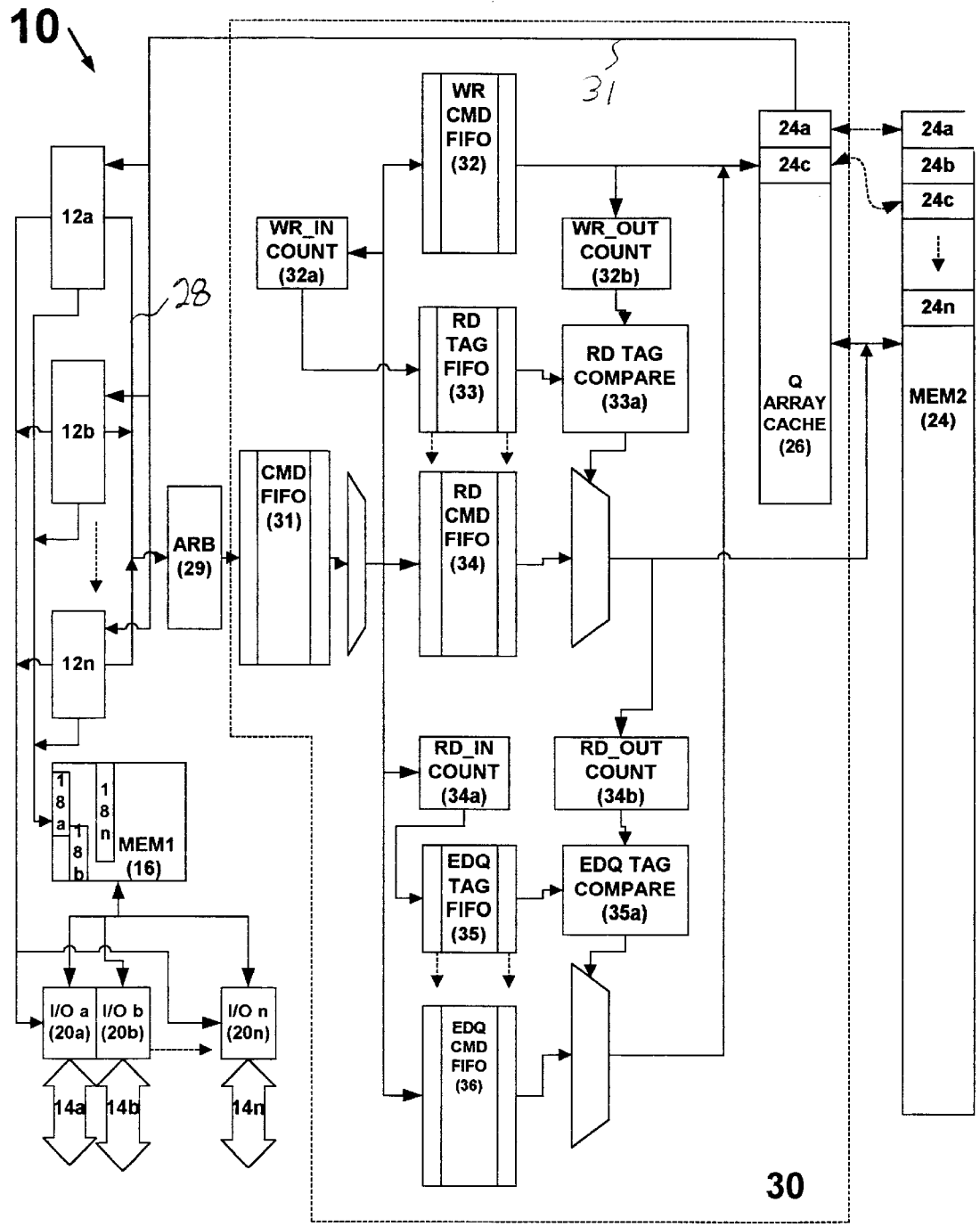
FIG. 1 is a block diagram of computer hardware on which a command ordering process may be implemented.

Referring to FIG. 1, a network processing system 10 operates as a data packet cross-bar that receives packets (through I/O buses 14a–14n from external devices, not shown), stores the packets temporarily, interprets header (address) information contained in each packet, and transmits each packet to a destination indicated by its header when an appropriate I/O bus 14a–14n is available. System 10 may include connections to thousands of I/O buses and may need to simultaneously store and track tens of thousands of data packets of various sizes before each packet is transmitted out of system 10. The storage, and the input and output of data packets to and from I/O buses 14a–14n, is controlled by several processors 12a–12n.

System 10 includes a first memory 16 to store the received data packets in a set of data buffers 18a–18n. Because the data buffers 18a–18n need not be located contiguously in first memory 16, each data buffer is indexed by a buffer descriptor address (BDA) that indicates the location and size of the buffer. As each packet is received from one of the I/O buses and stored by one of the processors in one of the buffers of the first memory 16, the processor identifies one of a set of I/O ports 20a–20n (each associated with one of the I/O buses) for transmitting the packet in the data buffer 18a–18n out of system 10. Because the I/O port chosen for transmitting a packet stored in a buffer is often busy receiving or sending packets for other buffers, system 10 includes a second memory 24. Second memory 24 stores a queue array, that is, a set of queue entries 24a–24n that contains BDAs for packets that are stored in buffers 18a–18n of first memory 16 and are waiting for a chosen I/O port 20a–20n to become available. Each queue entry 24a–24n corresponds to one of the I/O ports 20a–20n. To reduce the time required to access the queue entries 24a–24n stored in second memory 24, system 10 also includes a queue manager 30 that includes a queue array cache 26 for storing a sub-set of the most recently used queue entries. The contents of queue array entries 24a–24n in second memory 24 or queue array cache 26 may be changed by the execution of queue commands sent from a processor 12a–12n to the queue manager 30. Queue commands include write-back commands (also called writes) that causes the contents of a queue entry from queue array cache 26 to be written out to second memory 24, read commands that causes a queue entry to be read from second memory 24 and stored in queue array cache 26, and enqueue and de-queue commands ("EDQ" commands) that cause the storing and retrieving, respectively, of a BDA in or from an entry in the queue array cache 26.

Queue commands may be "related", that is directed to the same queue entry in queue array cache 26 and/or memory 24. Therefore, related queue commands must be executed in the proper order to maintain coherency between the entries in queue array cache 26 and second memory 24. For example, a write back command of a first queue entry in queue array cache 26 must be executed before a read command is executed to the same queue entry in queue array cache 26. Similarly, a read command of a queue entry from second memory 24 to queue array cache 26 must be executed before an EDQ command is executed that specifies the same queue entry in queue array cache 26. However, queue commands sent from a processor 12a–12n may not arrive at queue manager 30 in the order in which they must be performed because processors 12a–12n send queue commands on a shared command bus 28 to queue manager 30. Shared command bus 28 includes a command bus arbiter 29 that allows only a single processor 12a–12n at a time to send queue commands on bus 28. The arbitration for shared bus 28 by processors 12a–12n may cause related queue commands from a processor 12a–12n to arrive at queue manager 30 out of the order in which they must be executed.

Queue manager 30 receives queue commands from processors 12a–12n, sorts the queue commands into separate command FIFO's and then releases the sorted commands for execution in the proper execution sequence. In more detail, queue manager 30 receives queue commands from shared command bus 28 and stores the commands in a command inlet FIFO 31. Queue manager 30 then sorts and stores the received queue commands from inlet FIFO 31 into separate command FIFOs: a Write FIFO 32 for storing Write commands, a Read FIFO 34 for storing Read commands and an EDQ FIFO 36 for storing Enqueue and Dequeue commands. As commands reach the front of each respective FIFO, queue manager 30 determines the release sequence of stored queue commands that may be related.

Write commands may always be performed before related Reads commands, therefore, queue manager 30 releases write commands for execution whenever a Write command reaches the front of the Write FIFO 32.

To determine when a Read command may be released for execution from Read FIFO 34, queue manager 30 includes a first set of counters 32a and 32b, a RD_TAG FIFO 33 and a RD TAG COMPARE block 33a. The first set of counters 32a and 32b includes a WR_IN counter 32a that is incremented every time a Write command is loaded into Write FIFO 32, and a WR_OUT counter 32b that is incremented every time a Write command is removed from Write FIFO 32. As each Read command is loaded into Read FIFO 34, the value of WR_IN count 32a is tagged to that Read Command by storing the WR_IN count 32a in RD_TAG FIFO 33. The RD_TAG FIFO 33 and RD Command FIFO 34 are controlled to advance the stored Tags 33 and Read Commands 34 together to the output of the respective FIFOs. Read commands are released when the RD_TAG COMPARE logic 33a determines that the RD_TAG that corresponds to the Read command at the front of READ FIFO 33 is less than or equal to the WR_OUT count 32b. This determination ensures that a Read command is released only after an equal or greater number of Write commands have already been released and executed. Therefore, a Write command to a first queue entry is executed before a Read command that may relate to the same first queue entry, even if the Read command was received before the Write command by queue manager 30.

To determine when an EDQ command may be released for execution, queue manager 30 includes a second set of counters 34a and 34b, an EDQ TAG FIFO 35 and an EDQ TAG COMPARE logic block 35a. The second set of counters 34a and 34b includes a RD_IN counter 34a that is incremented every time a Read command is loaded into Read FIFO 34, and a RD_OUT counter 34b that is incremented every time a Read command is removed from Read FIFO 34. As each EDQ command is loaded into EDQ Command FIFO 36, the value of RD_IN counter 34a is tagged to that Queue Command by storing the value from RD_IN counter 34a in EDQ TAG FIFO 35. The EDQ TAG FIFO 35 and Queue_Command FIFO 36 are controlled to advance the stored EDQ Tags and Queue Commands together to the output of the respective FIFOs 35 and 36. An EDQ command is released for execution from the front of EDQ FIFO 36 only when EDQ_Tag compare logic 35a determines that the corresponding EDQ_TAG from EDQ TAG FIFO 35 is less than or equal to the value in RD_OUT counter 34b. This determination ensures that an EDQ command is released only after an equal or greater number of Read commands have been released and executed. Therefore, a Read command that may relate to the same queue array entry is executed before an EDQ command, even where the EDQ command was received first by queue manager 30.

The process of sorting related commands, hereafter referred to as "process 100", is not limited to use with the hardware shown in FIG. 1. Process 100 may find applicability in any computing or processing environment, and may be implemented in hardware, software, or a combination of the two. Process 100 may be implemented in computer programs that include executable instructions that are executed on programmable computers or other machines that each include a processor and a storage medium readable by the processor.

Other embodiments not described herein are also within the scope of the following claims.

What is claimed is:

1. A method comprising:
    receiving a set of related commands that includes commands of a first type and commands of a second type, the commands having a predetermined execution sequence, the commands being received in an arbitrary order that may be different from the execution sequence;
    releasing a later received command of the set for execution before releasing an earlier received command from the set, based on the execution sequence; and
    releasing a second type of command based on a number of released commands of the first type.

2. The method of claim 1, wherein releasing further comprises;
    incrementing a first count for each command of the first type received; and
    incrementing a second count each time a command of the first type is released; and
    comparing the first count and the second count.

3. The method of claim 2, wherein comparing comprises:
    determining the second count is greater than or equal to the first count.

4. The method of claim 3, wherein the types of commands include read commands and write commands directed to a storage medium.

5. The method of claim 4, wherein commands of the first type comprise write-back commands of an entry in a cache and commands of the second type comprise read commands from a memory.

6. The method of claim 4, wherein the set of related commands are received on a shared bus.

7. The method of claim 6, wherein the set of commands are received from processors that arbitrate for the shared bus.

8. An apparatus comprising:
    a first buffer for storing a first type of command;
    a second buffer for storing a second type of command; and
    circuitry configured to accept a set of related commands that includes a first command of the first type of command and a second command of the second type of command, the commands having a predetermined execution sequence, the commands being received in an arbitrary order that may be different from the execution sequence, and to release a later received command of the first type for execution from the first buffer before an earlier received command of the second type is released based on a number of released commands of the first type.

9. The apparatus of claim 8, further comprising:
    a comparator for determining when to release a command of the second type based on a number of released commands of the first type.

10. The apparatus of claim 9, further comprising:
    a first counter that increments a first count value each time a command of the first type is stored in the first buffer;
    a second counter that increments a second count value each time a command of the first type is removed from the first buffer,
    wherein the comparator compares the first count value to the second count value to determine when to release a second type of command for execution from the second buffer.

11. The apparatus of claim 10, a second type of command is released from the second buffer when the comparator determines the first count is greater than or equal to the second count.

12. The apparatus of claim 10, further comprising:
    a third buffer for storing the first count value, the third buffer and second buffer controlled together to move the stored contents in each of the third buffer and the second buffer from input to output substantially simultaneously.

13. The apparatus of claim 12, further comprising:
    a memory, wherein the types of commands include read commands and write commands directed to the memory.

14. The apparatus of claim 13, further comprising:
    a cache,
    commands of the first type comprising write-back commands of an entry in the cache and commands of the second type comprising read commands from the memory.

15. The apparatus of claim 13, further comprising:
    a shared command bus, the set of related commands being received on the shared bus.

16. The apparatus of claim 15, further comprising:
    processors that arbitrate for the shared bus.

17. An article comprising a machine-readable medium that stores machine-executable instructions for sorting and releasing related commands, the instructions when executed causing a machine to:
    receive a set of related commands that includes commands of a first type and commands of a second type, the commands having a predetermined execution sequence, the commands being received in an arbitrary order that may be different from the execution sequence;

release a later received command of the set for execution before an earlier received command from the set based on the execution sequence; and releasing a second type of command based on a number of released commands of the first type.

18. The article of claim 17, wherein instructions causing a machine to release a second type of command comprises instructions when executed causing a machine to:

increment a first count for each command of the first type received;

increment a second count for each command of the first type released; and compare the first count to the second count.

19. The article of claim 18, wherein comparing comprises instructions when executed causing a machine to determine the second count is greater than or equal to the first count.

20. The article of claim 19, wherein the types of commands includes reads commands and write commands directed to a storage medium.

21. The article of claim 20, wherein commands of the first type comprise write-back commands of a entry in a cache and commands of the second type comprise read commands from a memory.

22. The article of claim 20, wherein the set of related commands are received on a shared bus.

23. The article of claim 22, wherein the set of commands are received from processors that arbitrate for the shared bus.

24. A processing system comprising:

a processor; and a storage-medium accessible by the processor to store executable instructions, which when accessed by the processor cause the processor to:

receive a set of related commands that includes commands of a first type and commands of a second type, the commands having a predetermined execution sequence, the commands being received in an arbitrary order that may be different from the execution sequence;

release a later received command of the set for execution before releasing an earlier received command from the set, based on the execution sequence; and release a second type of command based on a number of released commands of the first type.

25. The system of claim 24, wherein releasing further comprises:

incrementing a first count for each command of the first type received; and incrementing a second count each time a command of the first type is released; and comparing the first count and the second count.

26. The system of claim 25, wherein comparing comprises:

determining the second count is greater than or equal to the first count.

27. The system of claim 26, further comprising:

a memory, wherein the types of commands include read commands and write commands directed to the memory.

28. The system of claim 27, further comprising:

a cache memory, wherein commands of the first type comprise write-back commands of an entry in the cache and commands of the second type comprise read commands from the memory.

29. The system of claim 27, wherein the set of related commands are received on a shared bus.

30. The system of claim 29, further comprising a plurality of processors, wherein the set of commands are received from at least one of the plurality of processors that arbitrate for the shared bus.

* * * * *